United States Patent [19]

Tendolkar et al.

[11] Patent Number: 5,389,286

[45] Date of Patent: * Feb. 14, 1995

[54] LIQUID CRYSTAL COPOLYMER CONTAINING ALKOXY-SUBSTITUTED PARA-PHENYLENE TEREPHTHALATE GROUPS

[75] Inventors: Ashok Tendolkar, New Cidco, India; Sridevi Narayan, Amherst, Mass.; Simon W. Kantor, Agawam, Mass.; Robert W. Lenz, Amherst, Mass.

[73] Assignee: University of Massachusetts at Amherst, Amherst, Mass.

[*] Notice: The portion of the term of this patent subsequent to Aug. 3, 2010 has been disclaimed.

[21] Appl. No.: 958,382

[22] Filed: Oct. 8, 1992

[51] Int. Cl.⁶ .................. C09K 19/52; C08G 63/00
[52] U.S. Cl. .................. 252/299.01; 525/437; 525/444; 525/448; 528/219; 528/272; 528/300; 528/301; 528/302; 528/308; 528/308.6
[58] Field of Search .......... 252/299.01; 428/1; 525/437, 444, 448; 528/219, 272, 300, 301, 302, 308, 308.6

[56] References Cited

U.S. PATENT DOCUMENTS 5,171,778 12/1992 Dekkers et al. .............. 524/539
5,232,778 8/1993 Farris et al. .............. 528/176

FOREIGN PATENT DOCUMENTS 2161171 1/1986 United Kingdom ........ C08G 63/18

OTHER PUBLICATIONS

"Synthesis and characterization of extended rod thermotropic polyesters with polyoxyethylene pendant substituents", R. W. Lenz et al., Polymer, 1991, vol. 32, No. 9, pp. 1703–1712.

"Rigid rod polymers having flexible side chains, 1 Thermotropic poly(1,4–phenylene 2,5-dialkoxyterephthalate)s", M. Ballauff, Makromol. Chem., Rapid Commun. 7,407–414 (1986).

Primary Examiner—Shean Wu
Attorney, Agent, or Firm—Richard P. Fennelly; Louis A. Morris

[57] ABSTRACT

Random and block copolyesters which are liquid crystalline can be formed containing: (a) alkoxy-substituted para-phenylene terephthalate groups (i.e., derived from an analogously substituted hydroquinone reagent); and (b) alkylene-terephthalate groups (e.g., where the alkylene moiety contains 2 to 10 carbon atoms).

10 Claims, 1 Drawing Sheet

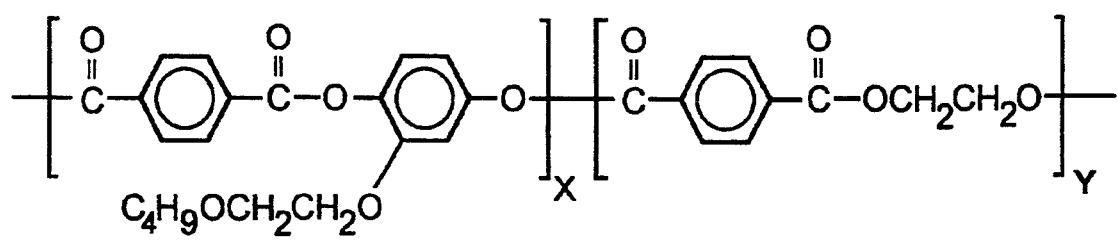
PBEM-Block | PET-Block
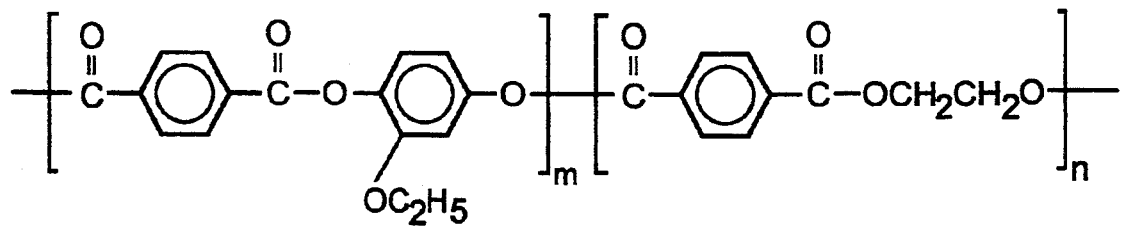
Random Copolymer

LIQUID CRYSTAL COPOLYMER CONTAINING ALKOXY-SUBSTITUTED PARA-PHENYLENE TEREPHTHALATE GROUPS

BACKGROUND OF THE INVENTION

A variety of liquid crystal polymer and copolymer compositions are known to persons in the art.

R. W. Lenz et al. in Polymer, 1991, Volume 32, Number 9, pp. 1703–1712, discuss the synthesis of extended rod thermotropic polyesters with polyoxyethylene pendant substituents. One class of thermotropic polyester composition which was shown by Lenz et al. and which was designated as "Series VI" contained alkoxy (e.g., methoxy or ethoxy) or —(OCH$_2$CH$_2$)$_n$OR', with R' being methyl or ethyl, side chains on a para-phenylene group derived from an analogous hydroquinone reagent and also contained a terephthaloyl group. Such polyesters were indicated as lacking a flexible alkylene spacer unit which was included in earlier polymers designated as "Series IV" which also comprise a linkage: Ar—C(O)OArOC(O)—Ar— having alkoxy or (OCH$_2$CH$_2$)$_n$OR' substitution on the central phenylene ring.

British Patent No. 2,161,171 gives another example of wholly aromatic polyesters having liquid crystalline characteristics which can include terephthaloyl, isophthaloyl, and alkoxy-substituted para-phenylene groups as essential components.

SUMMARY OF THE INVENTION

The present invention relates to liquid crystalline copolymers which comprise alkoxy-substituted para-phenylene terephthalate groups, and alkylene terephthalate groups. Both random, random block, and ordered segmented and block copolymers are within the contemplation of the present invention.

DESCRIPTION OF THE DRAWING

The present description of the present invention is further illustrated by reference to the Drawing which depicts: (A) an embodiment of a block copolymer comprising a polybutoxyethoxyphenylene terephthalate monomer (PBEM) block and a poly(ethylene terephthalate) (PET) block; and (B) a random copolymer containing the alkoxy-substituted paraphenylene terephthalate, and alkylene terephthalate moieties (or groups) which are also discernible in the block copolymer structure. As would be appreciated by the person in the art, the block copolymer units "x" and "y" are more similar and regular, whereas the units "m" and "n" in the random copolymer are more randomized in size and occurrence.

DETAILED DESCRIPTION OF THE PRESENT INVENTION

The terminology "terephthalate" or "terephthaloyl" as used herein is intended to cover or relate to groups having the structure —C(O)ArC(O)— where the carbonyl groups, C(O), are bonded para- to one another and Ar is a phenyl ring. Terephthaloyl chloride is a preferred reagent to supply such a group to the block and random copolymers described herein.

The terminology "alkoxy-substituted para-phenylene" is meant to cover structures of the type depicted by

where A, as "alkoxy", is to be construed as encompassing both alkoxy groups directly bonded to the para-phenylene structure (Ar) as shown by —OR, with R being alkyl, or by presence of an intermediate oxyalkylene unit as in (OR')$_n$OR'', with n being 1 to 7, R' being alkylene of C$_2$ to C$_6$, and R'' being the same as R, namely alkyl. Representative acid chloride hydroquinones and their diacetates which can be used include ethoxyethoxyethoxy hydroquinone, ethoxy hydroquinone, and ethoxy 1,4-diacetoxy benzene. The alkyl and alkylene groups are preferably lower alkyl and lower alkylene of from 1 to 4 carbon atom content.

The terminology "oxy-alkylene" is meant to encompass structures of the formula —O—(CH$_2$)$_n$ where n can range from 2 to 10. Ethylene glycol is a preferred reagent to supply this group and butylene glycol is another possible reagent to employ.

Random copolymers in accordance with the present invention can be prepared by using conventional copolyesterification procedures which comprises reacting the selected reagents in the initial reaction mixture either by a solution polymerization process using an inert solvent, with or without an amine acid acceptor, or by a melt reaction process in which a diacetate of the selected substituted hydroquinone and an aromatic dicarboxylic acid are reacted with a preformed polyester of the same aromatic acid and a different aliphatic diol, such as ethylene glycol, using a conventional esterification catalyst. The melt reaction process can be carried out in two steps: (a) initially the reaction of acid monomer and diacetate monomer with the preformed polymer to form a low viscosity melt; and (b) further polymerization of the low viscosity melt under vacuum and at a higher temperature to yield the desired copolyester. The reaction time to form the preformed polymer is one to three hours with the subsequent polymerization being three to five hours. The structure of the resulting polymer can be appropriately controlled by the molar concentration of aliphatic diol used.

Examples 2–20 given herein set forth particular embodiments of random copolymers in accordance with the present invention. In general, the inherent viscosities (in 4-chlorophenol at 50° C.) varied from 0.4 dl/gm to 2.2 dl/gm depending on the molar content of aliphatic diol.

The inherent viscosity of a copolyester with 100% of substituted hydroquinone was as high as 2.2, but the inherent viscosity of the polymers with a lower percent of substituted hydroquinone decreased and levelled off at 0.4 dl/gm or below at a 50% content of the substituted hydroquinone under the particular conditions that were used. Similarly, the melting temperatures of the copolyesters decreased with decreasing amount of substituted hydroquinone down to 60 mole percent but increased thereafter. Polarizing microscopy observations showed that the birefringence and texture of the polymers depended on the concentration of the mesogenic groups in the main chain. Polymers with a molar concentration of diphenol of from 100% to 60% showed two distinct transitions, the first one corresponding to the melting to nematic transition and the second to a change in nematic texture. On further heating, the polymers formed a homeotropic state at around 290°–300° C. but the polyesters with a lower mole percent of diphenol than 60% were crystalline and showed only a single transition from the crystalline directly to the isotropic state.

In regard to block copolymers in accordance with a preferred embodiment of the present invention the block containing the substituted hydroquinone derived moiety can vary from about 2 to about 10 blocks as can the polyalkylene terephthalate block. The group (—O—R—O—) in the latter block can have from about 2 to about 8 carbon atoms with 2 or 4 being most preferred and is derived from a glycol reagent.

The process of block copolymerization may comprise reacting the starting materials in an initial reaction mixture by a solution polymerization process. The reaction may be carried out in one flask wherein the two blocks are formed in two stages and the block copolymerization reaction occurs in sequence.

In a preferred process, the first stage comprises the reaction of either bis(2-hydroxyethylene) terephthalate (BHET) or bis(4-hydroxybutylene) terephthalate (BHBT) with an excess of acid chloride to give an acid chloride end-capped oligomer. The reaction conditions for this stage are preferably at 100° C. for three to four hours. In the second stage, stoichiometric amounts of the acid chloride and ethoxyhydroquinone are added to the reaction vessel, and the temperature is increased to 110° C. or 200° C., depending on the solvent used.

The low temperature solution polymerization involves reaction in 1,1,2,2-tetrachlorethane, for example, with pyridine as the acid acceptor, while in the high temperature copolymerization 1-chloronaphthalene was used as a solvent and the evolved hydrogen chloride gas was removed by a constant flow of argon. The time of reaction has been varied from nineteen to forty-two hours. Further details are provided in Examples 22–28.

The block sizes can be controlled by the stoichiometry of the reactants. The ratios of the block sizes, in turn, control the structure of the polymers. The inherent viscosities (in 4-chlorophenol at 50° C.) of the series of copolyesters can be varied over a wide range from 0.2 to at least 1.3 dl/gm and higher depending upon the reaction conditions employed, namely the nature of the solvent, acid acceptor, temperature, and time of reaction. DSC analysis of block copolymers in accordance with the present invention showed the presence of a single, broad melting endotherm for most of the copolyesters. It occurred at lower temperatures for increasing amounts of the substituted hydroquinone monomer. Observations of polymer samples placed on a hot stage of a polarizing optical microscope showed that the birefringence and texture of the polymers depended upon the ratio of the block sizes. As the rigid block-size was increased, a clear transition from spherulitic to biphasic to a total nematic texture was observed. Isotropization before degradation was not observed in any of the block copolyesters.

In the poly(ethylene terephthalate)-containing copolyesters, as the ratio of the blocks containing substituted hydroquinone to those containing poly(alkylene terephthalate) varied from 3:6 to 6:6 to 6:4, the texture observed of the respective samples on the polarizing microscope at high temperatures varied from spherulitic to biphasic to nematic. Isotropization in these liquid crystalline copolyesters was not observed up to 320° C. Crystallization was observed within the isotropic matrix on cooling for a 6:6 block copolymer. Solid phase polymerization wherein the polymer is subjected to high temperature under vacuum conditions can be used to enhance the molecular weight of the polymers to some extent.

The poly(butylene terephthalate)-containing copolyesters synthesized at lower temperatures exhibited properties which were very similar to their poly(ethylene terephthalate)-containing counterparts. But the polymerization reactions carried out in 1-chloronaphthalene at 200° C. yielded polymers with very high solution viscosities. These polymers formed good solution-cast films with good strength and mechanical integrity. On heating, a nematic texture developed as observed under cross-polars and birefringence continued up to 330° C.

It is deemed that the respective amounts of units "x" or "m" and "y" or "n" depicted in the drawing can be varied widely, e.g.; from about 20% to about 80% and about 80% to about 20%, respectively, in the desired copolymer compositions.

One type of end use for the copolymers disclosed herein is as an additive to a polyester resin to form a blend from which fibers can be made, as described in U.S. Pat. No. 5,232,778, filed on even date herewith.

The following Examples illustrate further particulars of the present invention.

COMPARATIVE EXAMPLE 1

To a 100 ml three-neck flask were added 7.26 g (0.03 mol) of an ethoxyethoxyethoxy hydroquinone and 6.0 g (0.06 mol) of triethylamine as an acid acceptor. Then, 100 ml of methylene chloride was added to the flask with vigorous agitation to form a solution. Thereafter, 6.1 g (0.03 mol) of terephthaloyl chloride was added slowly to the reaction mixture, and the contents of the flask were stirred for twenty-four hours with a magnetic stirrer at room temperature, and then refluxed for twenty-four hours. A pale yellow polymer started to precipitate out after about thirty minutes of stirring. At the conclusion of the refluxing period, the mixture was cooled to room temperature and was added to a threefold excess methanol. The polymer was filtered from the solution to obtain 10.2 g of product (93% yield). The polymer product was dried and was extracted with acetone in a Soxhlet extractor to obtain a more pure polymer at a yield of 89%. The melting transition of the polymer was 210° C. as determined by DSC, and the inherent viscosity was 1.13 dl/g in 4-chlorophenol (1% at 50° C.). The elemental analysis of the polymer was as follows: calcd. C=64.52%, H=5.38%, obsvd. C=63.95, H=5.39 and the polymer was stable up to 290° C. This polymer has been previously reported by Lenz et al., Polymer, 1991, Vol. 32, No. 9, pp. 1703–1712.

EXAMPLE 2

This procedure illustrates the preparation for the copolymer with a ratio of 60:40 of substituted hydroquinone:ethylene glycol.

To a 500 ml three-neck flask were added 4.356 g (0.018 mol) of an ethoxyethoxyethoxy hydroquinone, 0.744 g (0.012 mol) of ethylene glycol, and 2.64 g of triethylamine as an acid acceptor. Then, 350 ml of methylene chloride was added to the flask, and the reactants were stirred vigorously with a mechanical stirrer until dissolution occurred. Then, 6.1 g (0.03 mol) of terephthaloyl chloride was added slowly to the reaction mixture, and the contents of the flask were stirred for twenty-four hours at room temperature, and then was refluxed for twenty-four hours. A pale yellow polymer started precipitating out after about thirty minutes. The reaction was terminated at the conclusion of the second step by adding the reaction mixture to a three-fold excess of methanol, and the polymer was filtered from the solution to obtain 8.28 g of polymer (92% yield). The polymer was dried and was extracted in a Soxhlet extractor to obtain a more pure polymer at a yield of 88%. The melting transition of the polymer was determined by DSC as indicated by a broad endotherm at approximately 160°–200° C., and the inherent viscosity was 0.645 dl/g in 4-chlorophenol at a concentration of 1% at 50° C.). The polymer was stable up to 325° C. Elemental analysis: calcd. C=63.73, H=4.89, obsvd. C=63.83, H=5.30.

EXAMPLES 3–20

In a 250 ml two-neck flask equipped with a distillation unit and a stirrer was placed 5.76 g (0.03 mol) of poly(ethylene terephthalate). The polymer was dried at 140° C. for six hours with argon, after which, the temperature of the bath was raised to 280° C., and the polymer was melted under argon. To this melt were added 4.98 g (0.03 mol) of terephthalic acid, 7.14 g (0.03 mol) of ethoxyhydroquinone diacetate and 0.005 wt % of tetrabutyl orthotitanate, and the reaction was carried out for two hours. During the process, the viscosity of the melt appeared to decrease. After the stipulated amount of acetic acid 3.6 g (0.03 mol) was evolved, the argon flow was stopped, and the pressure in the reaction flask was decreased from 760 mm to 0.05 mm in thirty minutes. The melt was stirred slowly at 280° C. for three hours and then cooled when the reaction was apparently completed as indicated by an increase in the viscosity of the melt based upon a change in the speed of the rotation of the stirrer. The polymer (12.1 g) was dissolved in trifluoroacetic acid, was precipitated in methanol, washed with methanol, was filter and was dried in vacuum. (Tm=208° C. by DSC)

The inherent viscosity of the polymer was 0.27 dl/g in 4-chlorophenol at a concentration of 1% at 50° C.

The same general procedure just described was used for a series of syntheses of copolyesters and Table 1 sets forth the polymer composition, yield, melting temperatures, and texture:

TABLE 1

| Polymer Comp. r:c[1] | X in R'[2] | Yield %[3] | Inherent Viscosity (dl/g)[4] | $T_1$[5] °C. | $T_2$[6] °C. | Texture[7] |
|---|---|---|---|---|---|---|
| 100:0 | 2 | 91 | 1.1 | 195 | 257 | nematic |
| 100:0 | 2 | 87 | 2.14 | 210 | 257 | nematic |
| 80:20 | 2 | 90 | 0.87 | 187 | 242 | nematic |
| 60:40 | 2 | 89 | 0.65 | 157 | 254 | nematic |
| 60:40 | 2 | 87 | 0.62 | 157 | 256 | nematic |
| 60:40 | 2 | 92 | 0.45 | 154 | 257 | nematic |
| 40:60 | 2 | 90 | 0.49 | 157 | — | nematic |
| 20:80 | 2 | 92 | 0.47 | 185 | — | biphasic |
| 0:100 | — | 95 | 0.48 | 256 | — | crystalline |
| 100:0 | 0 | 86 | 0.70 | 212 | 212 | nematic |
| 80:20 | 0 | 87 | 0.63 | 212 | 257 | nematic |
| 60:40[8] | 0 | 90 | 0.27 | 208 | 267 | nematic |
| 60:40 | 0 | 90 | 0.6 | 205 | 267 | nematic |
| 60:40 | 0 | 89 | 0.63 | 205 | 267 | nematic |
| 40:60 | 0 | 89 | 0.52 | 207 | — | biphasic |
| 40:60 | 0 | 86 | 0.50 | 207 | — | biphasic |
| 20:80 | 0 | 88 | 0.45 | 232 | — | crystalline |

TABLE 1-continued

| Polymer Comp. r:c[1] | X in R'[2] | Yield %[3] | Inherent Viscosity (dl/g)[4] | $T_1$[5] °C. | $T_2$[6] °C. | Texture[7] |
|---|---|---|---|---|---|---|
| 100:0 | 6 | 73 | 0.31 | 173 | 240 | biphasic |

[1]r refers to the mole ratio of repeat unit containing the ethoxyhydroquinone —C(O)ArC(O)Hq–, where Ar is phenylene and Hq represents the ethoxyhydroquinone fragment —OAr(R')O, where R' = (OCH$_2$CH$_2$)$_x$OCH$_2$CH$_3$; and c refers to the mole ratio of the repeat unit containing the alkylene unit, —C(O)RC(O)OR'—O—, where R is phenylene and R" is (CH$_2$)$_n$ with n = 2.
[2]this defines the value x for R' in footnote (1).
[3]after Soxhlet extraction.
[4]in 4-chlorophenol at 50°, 0.125 g/25 ml.
[5]melting temperature.
[6]LC to LC transition.
[7]as observed for a sample on the hot stage of a polarizing microscope at a temperature between the melting temperature and the LC to LC transition temperature for nematic or bisphasic polymers and below the melting temperature for crystalline polymers.
[8]made by melt polymerization.

Copolyesters with r:c ratios of from 100:0 to 60:40 formed nematic liquid crystalline phases and exhibited DSC thermograms with two distinct endotherms. The copolyesters with lower amounts of hydroquinone (either ethoxyethoxyethoxy hydroquinone, n=2, or ethoxy hydroquinone, n=o) showed only a crystalline texture. The former polyesters did not undergo isotropization even when heated to 325° C., but formed instead a homeotropic phase at higher temperatures.

EXAMPLE 21

This Example illustrates the preparation of a block copolymer in accordance with the present invention having a ratio of 50:50 of substituted hydroquinone:ethylene glycol and a block size ratio of 6:6.

To a 500 mL three-necked flask, were added 6.00 g (0.0236 mol) of bis(2-hydroxyethyl terephthalate) (BHET) and 25 mL pyridine. The flask was fitted with a condenser, an argon inlet and outlet and a stirrer of TEFLON fluoropolymer. After dissolving the BHET in pyridine, 6.394 g (0.0314 mol) of terephthaloyl chloride dissolved in 200 mL of tetrachloroethane (TCE) was cannulated into the flask. The temperature was increased to 90° C. and maintained at that temperature for three hours. At the end of that period, the solution was slightly turbid and at this stage, 7.992 g (0.0393 mol) of terephthaloyl chloride was added to the vessel under a positive flow of argon.

After ten minutes, 7.279 g (0.0472 mol) of ethoxy hydroquinone was added to the reaction mixture and enough solvent was cannulated in to keep the reactants in solution. At this point, the solution became cloudy due to the formation of pyridinium hydrochloride. The temperature was increased to 100° C., and the polymerization was carried out for twenty hours to give a pale yellow, slightly cloudy solution. The reaction was terminated by cooling the reaction mixture to room temperature and pouring it into 1500 mL of methanol.

The mixture was filtered to obtain 27.5 g of polymer. The crude polymer was extracted in a Soxhlet-extractor using methanol/acetone (50:50) for about a day and, after drying in a vacuum oven at 90° C. for about three days, about 19.5 g of pure polymer was obtained. The inherent viscosity was 0.3 dl/g in 4-chlorophenol at 50° C. for a concentration of 0.5 g/dl. The polymer was stable up to 350° C., and the thermograms obtained by differential scanning calorimetry, DSC, contained three sharp endotherms at 223° C., 254° C. and 266° C. in the heating cycle. The block copolymer showed a typical biphasic structure by observation on a polarizing microscope at around 250° C. and the texture continued up to 320° C. Crystallization within the isotropic matrix was observed at 200° C. on cooling and these crystals were observed to melt at about 233° C. The composition of the two segments in the copolymer was confirmed to be 49% PMEH and 51% PET by $^1$H NMR.

EXAMPLE 22

This Example illustrates the preparation of a block copolymer in accordance with the present invention having a ratio of 50:50 of substituted hydroquinone:butylene glycol and a block size ratio of 6:6.

A 500 mL three-neck flask was fitted with a water-condenser, an argon inlet and outlet, a dropping funnel and provided with a stirrer of TEFLON flucropolymer. The flask was heated and completely flushed with argon to remove any moisture and 6 g (0.0194 mol) of bis(4-hydroxybutyl terephthalate) BHBT and 100 mL of 1-chloronaphthalene (1-CN) was charged into it. A solution of 5.239 g (0.0259 mol) terephthaloyl chloride in 200 mL 1-chloronaphthalene was placed in the dropping funnel and added dropwise to the reaction mixture at 100° C. A constant flow of argon was used to remove the HCl formed. At the end of five hours, 6.549 g (0.0323 mol) of terephthaloyl chloride was added to the flask followed by the addition of 5.638 g (0.0388 mol) of ethoxyhydroquinone after ten minutes. The temperature of the reaction mixture was increased to 190° C., and the polymerization was maintained at that temperature for forty-two hours. At the end of the period, a gel-like material was formed which was dissolved in 1-chloronaphthalene, and the hot reaction mixture poured into 1500 mL methanol to yield white, fibrous polymer particles. After filtering, the polymer product was washed by stirring in hot, boiling methanol for three to four hours and was then dried in a vacuum oven for three to four days at 90° C. About 17 g of the purified polymer was obtained.

The inherent viscosity of the polymer product was 1.1 dl/g in a 60:40 mixture of p-chlorophenol/tetrachlorethane at 26.5° C. at a concentration of 0.5 g/dl. The polymer was dissolved in hexafluoroisopropanol, and the solution was cast in molds of TEFLON fluoropolymer to yield thin films of good strength and mechanical integrity. Nematic texture developed around 120° C. when observed under on a polarizing microscope and birefringence continued up to 330° C. The polymer was stable up to 350° C. and showed a melting endotherm around 202° C. in the DSC.

EXAMPLES 53–28

Using the processes of Examples 21 and 22, different samples of block copolyesters were synthesized with varying ratios of block sizes, The details of the methods of polymerization and the properties of the polymers are listed in Tables 1 and 2 which follow:

TABLE 1

| PMEH:PET Ratio of Block Sizes | Solvent | Inherent Viscosity dl/g | Texture | $T_{peak}$ (°C.) | $T_g$ (°C.) |
|---|---|---|---|---|---|
| 3:6 | TCE | 0.58 | Spherulitic | 241 | 77 |
| 5:6 | TCE | 0.1 | Nematic (only when quenched) | 223 | 75 |
| 6:6 | TCE | 0.3 | Biphasic (at high temperatures) | 223 254 266 | 80 |
| 6:4 | 1-CN | 0.45 | Nematic (up to 330° C.) | 215 225 | — |

TABLE 2

| PMEH:PBT Ratio of Block Sizes | Solvent | Inherent Viscosity dl/g | Texture | $T_{peak}$ (°C.) |
|---|---|---|---|---|
| 6:6 | TCE | 0.28 | Biphasic (at high temperatures | 139 198 |
| 6:6 | 1-CN | 1.1 | Nematic | 202 |

The foregoing Examples should not be construed in a limiting sense since they are merely intended to set forth certain embodiments of the claimed invention. The claims which follow set forth the scope of protection desired.

We claim:

1. A liquid crystalline copolymer comprising:
   (a) alkoxy-substituted para-phenylene terephthalate groups; and
   (b) alkylene-terephthalate groups.

2. A copolymer as claimed in claim 1 wherein the alkoxy in (a) is selected from the group consisting of the formula —OR, where R is alkyl and the formula (OR')-$_n$OR", where R' is alkylene, n is an integer from 1 to 7, and R" is alkyl, the alkyl and alkylene having $C_2$–$C_4$ carbon atoms.

3. A copolymer as claimed in claim 1 wherein alkylene in (b) is $C_2$ to $C_{10}$ alkylene.

4. A copolymer as claimed in claim 2 wherein alkylene in (b) is $C_2$ to $C_{10}$ alkylene.

5. A copolymer as claimed in claim 1 which is a random copolymer.

6. A copolymer as claimed in claim 1 which is a block copolymer.

7. Blends of a polyester resin matrix and a liquid crystalline copolymer as claimed in claim 1.

8. Blends as claimed in claim 7 wherein the copolymer is a random copolymer.

9. Blends as claimed in claim 7 wherein the copolymer is a block copolymer.

10. Blends as claimed in claim 7 wherein the polyester is poly(ethylene terephthalate).

* * * * *